United States Patent [19]
Ogg

[11] 3,941,363
[45] Mar. 2, 1976

[54] POSITIONING CLAMP

[75] Inventor: Dustin Lance Ogg, Milwaukie, Oreg.

[73] Assignee: Carlton Company, Portland, Oreg.

[22] Filed: Nov. 4, 1974

[21] Appl. No.: 520,291

[52] U.S. Cl................ 269/100; 51/217 R; 269/165; 269/237; 269/254 CS
[51] Int. Cl.² .......................................... B25B 1/04
[58] Field of Search.......... 269/254 R, 254 CS, 229, 269/196, 95, 99, 100, 237, 238, 165; 51/217 R, 218 R, 222

[56] References Cited
UNITED STATES PATENTS

| | | | |
|---|---|---|---|
| 1,536,310 | 5/1925 | Rothlisberger...................... | 269/238 |
| 2,821,064 | 1/1958 | Nelson .......................... | 269/254 CS |
| 3,175,353 | 3/1965 | Coffey............................. | 269/254 R |
| 3,855,738 | 12/1974 | Guggenheim et al......... | 269/254 CS |

*Primary Examiner*—Al Lawrence Smith
*Assistant Examiner*—Robert C. Watson
*Attorney, Agent, or Firm*—Kolisch, Hartwell, Dickinson & Stuart

[57] ABSTRACT

A positioning clamp for holding a workpiece properly oriented with respect to a work station adjacent the clamp. The clamp disclosed releasably holds saw chain during an operation such as grinding of a cutter in the chain. The clamp is releasable to permit the saw chain to be advanced in steps along a channel defined between jaw margins in the clamp. These jaw margins include portions which face each other, and that come against opposite sides of the saw chain when clamping it, which are shaped to complement the shape of the rivet ends usually provided in saw chain to hold it together. One jaw member is mounted for pivotal movement toward and away from the other to effect clamping and release positioning through a ball pivot. The jaw members are biased toward each other to exert a clamping pressure, and selectively operable means is provided for swinging the jaw members away from each other to produce release.

6 Claims, 8 Drawing Figures

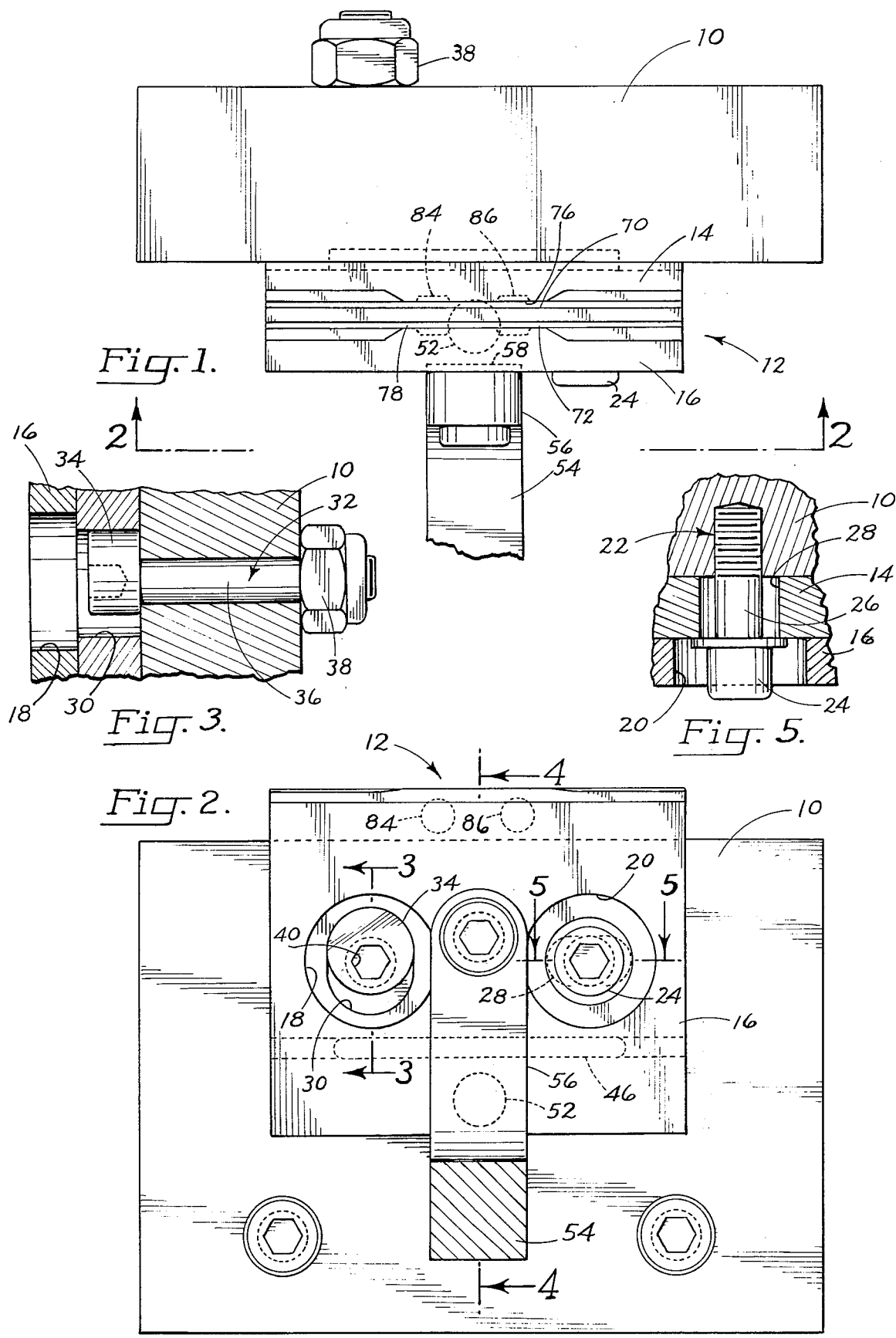

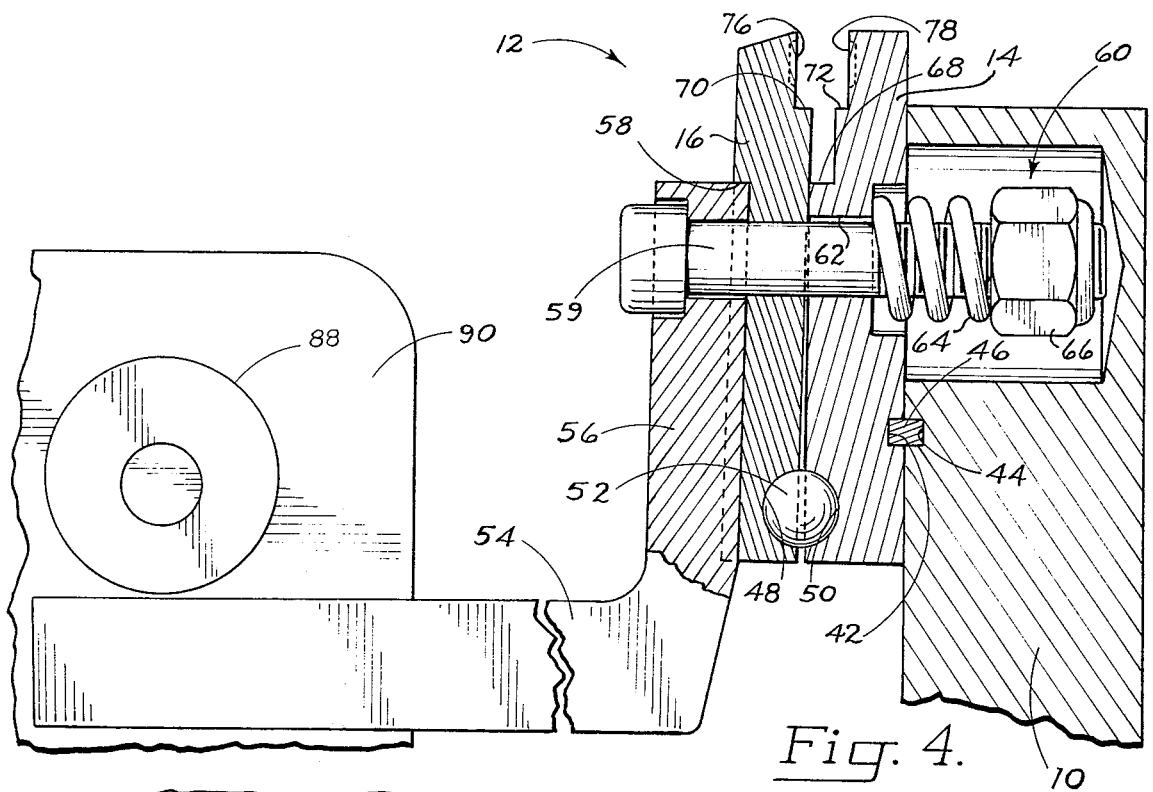
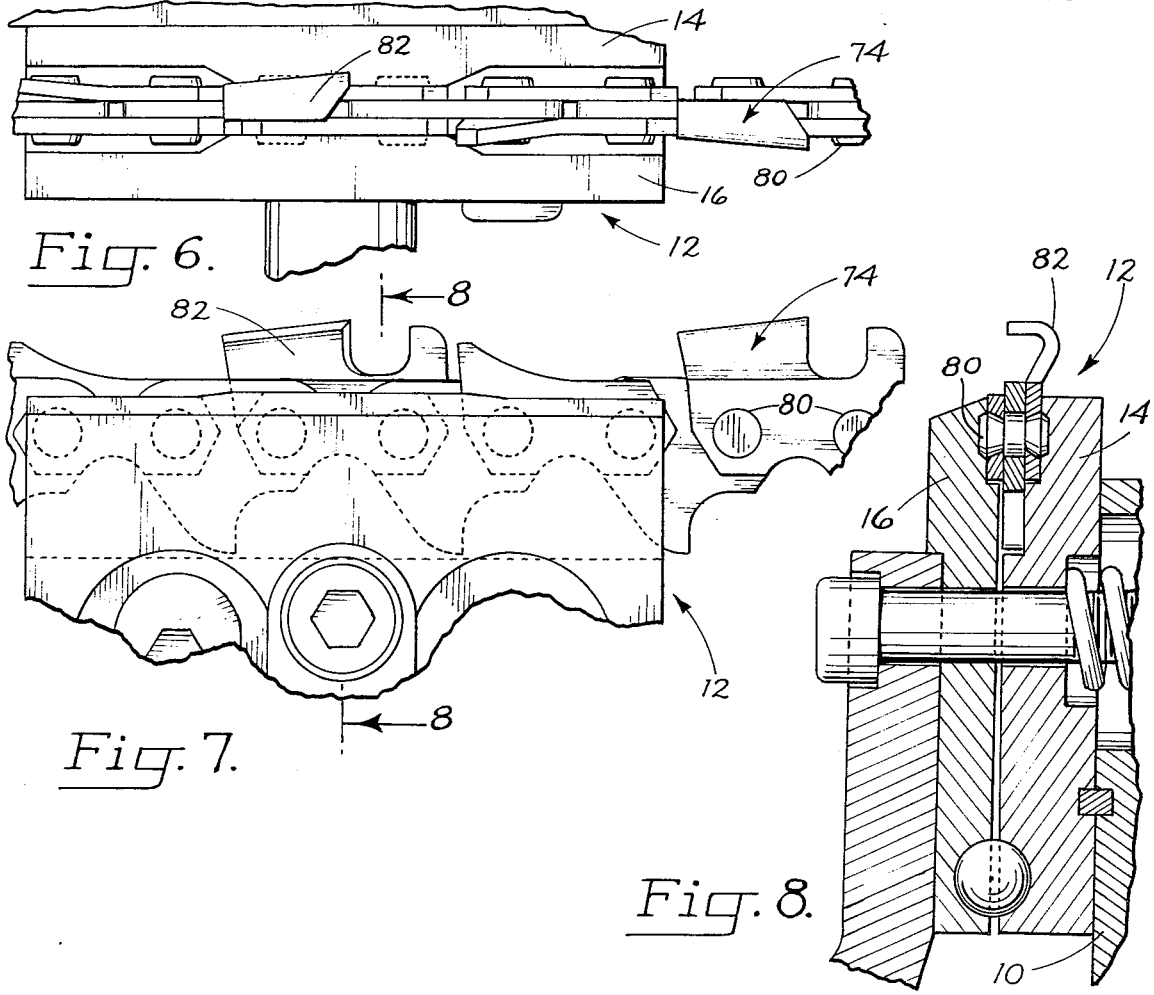

POSITIONING CLAMP

This invention relates generally to a positioning clamp. More particularly, the invention concerns a releasable clamp for holding a workpiece in a precisely oriented position while a work operation is performed on the workpiece.

In the manufacture of saw chain, the cutters on the chain may be sharpened before the cutters are assembled into the completed chain, or after assembly. The latter procedure has some definite advantages, in that it minimizes inadvertent dulling of cutters before the chain is packaged for distribution. In sharpening an assembled chain, a grinding wheel may be brought down at a precise location and angle relative to the cutter. The operation requires that successive portions of the chain be held at a precise location relative to the work station (which is the station into which the grinding wheel is moved). It is also important that after sharpening the chain be releasable, to prepare a succeeding portion of the chain for sharpening.

A general object of the invention, therefore, is to provide a novel clamp for holding a workpiece with such effective to hold the workpiece in a place which is precisely oriented with respect to an adjacent work station.

More specifically, the invention concerns a clamp for holding saw chain, including relatively movable jaw members, and opposed face portions in said jaw members shaped to complement the shape of portions of the saw chain whereby with clamping pressure exerted there is a tendency for the chain to move into a precise position with respect to the clamp.

Another object of the invention is to provide a clamp with jaw members, and a novel mounting for one jaw member on the other which enables the same to move in a swing direction toward and away from the opposing jaw member, and also provides a limited amount of lateral shifting of the jaw member, promoting an accurate seating relationship of the jaw members about opposite sides of a chain when such is clamped.

Yet another object is to provide a novel combination of clamp and support therefor, which affords adjustments in the position of the clamp with respect to the support to accommodate, when necessary, adjustment in the position that a portion of a saw chain is held with respect to a work station adjacent the clamp.

A further feature of the invention is the provision of a clamp including opposed jaw members having an opposed set of margins that define between them a course adapted for the lengthwise travel of chain, such margins further including opposed face portions shaped to complement the shape of a portion of the saw chain handled promoting proper positioning of the saw chain when clamping is produced.

These and other objects and advantages will become more fully apparent as the following description is read in conjunction with the accompanying drawings, wherein:

FIG. 1 is a top plan view of a clamp as contemplated herein showing such secured to a support;

FIG. 2 is a side elevation of the clamp illustrated in FIG. 1;

FIG. 3 is a cross-sectional view, taken generally along the line 3—3 in FIG. 2;

FIG. 4 is a cross-sectional view, taken generally along the line 4—4 in FIG. 2;

FIG. 5 is a cross-sectional view, taken generally along the line 5—5 in FIG. 2;

FIG. 6 is a top view of portions of the clamp and showing a portion of a saw chain clamped therein;

FIG. 7 is a side elevational view of the clamp and chain as pictured in FIG. 6; and FIG. 8 is a cross-sectional view, taken generally along the line 8—8 in FIG. 7.

Referring now to the drawings, and first of all more particularly to FIGS. 1 and 2, indicated at 10 is a support. Such is mounted in a stationary position in the equipment with which the clamp of the invention is installed. Mounted on the support is clamp mechanism shown generally at 12. As will be described in greater detail below, the clamp mechanism is adapted to clamp onto a portion of a saw chain to hold the same while grinding of a cutter therein is performed. The support and clamp mechanism, therefore, form part of a grinding machine which further includes a power-driven grinding wheel, which is moved into the cutter of a tooth held by the clamp mechanism for the purpose of sharpening it. The grinding wheel and other particulars of the machine have been eliminated from the drawings for reasons of simplicity, and since particulars of such machinery form no part of the instant invention. Suffice it to be said that the work station, or the region where the grinding wheel performs its grinding, is directly above the clamp mechanism and midway between its sides, as such as illustrated in FIG. 2.

Clamp mechanism 12 includes a pair of jaw members indicated at 14 and 16. Jaw member 14 lies against support 10, whereas jaw member 16 lies against member 14 and forms the outer jaw member in the clamp mechanism. As perhaps best illustrated in FIG. 2, the outer jaw member 16 is provided with a pair of enlarged bores 18, 20 exposing portions of the inner jaw member to the outside of the clamp mechanism.

Referring now more particularly to FIGS. 1, 2 and 5, the inner jaw member 14 is secured to support 10 with a screw fastener 22 having a hex recessed head 24 (provided for the attachment of a fastening tool). Shank 26 of the fastener passes through a slot 28 formed in the jaw member, which slot accommodates a limited amount of side-to-side movement in the jaw member relative to fastener 22. Access to the hex head at the front of the clamp is provided by the bore 20 which exposes this head.

Referring now to FIGS. 1, 2 and 3, jaw member 14 is also provided with an elongate cam opening 30 extending through it exposed to the front face of the clamp mechanism by bore 18. A cam fastener shown at 32 including a cam head 34 has its cam head lodged within cam opening 30. Shank 36 in the cam fastener extends through an accommodating bore in support 10 and receives on its threaded end a nut 38. The cam head has a hex recess 40 therein adapted to receive the end of a fastening tool. From this, it should be obvious that with loosening of the nut and turning of the cam fastener to rotate the cam head, side-to-side movement may be imparted to the inner jaw member 14.

Adjacent the base of the inner jaw member, and as perhaps best illustrated in FIGS. 2 and 4, is an elongate slot 42. A complementing slot 44 is provided in support 10. Fitted within the slots 42, 44 is a key 46. The key and slots provide guide means guiding adjustable movement of the jaw member 14 relative to support 10 along a substantially horizontal path.

The outer jaw member in the clamp is mounted on the inner jaw member by means accommodating movement of the outer jaw member toward and away from the inner one. More specifically, and referring to FIGS. 2 and 4, adjacent the base and on the inner face of the outer jaw member is a semispherical cavity 48. A similar cavity 50 is provided in the base of the face of jaw member 14. Ball member 52 fits within these two cavities and provides for pivotal movement of the outer jaw member in a swing direction extending toward (and away from) the inner jaw member, about a horizontal axis which extends through the center of the ball member.

With reference to FIGS. 1, 2 and 4, an actuating arm 54 has an upstanding end portion 56 extending upwardly along the outer face of jaw member 16. Such fits within an accommodating slot 58 formed in this jaw member. Passing through this end portion and jaw members 14 and 16 is the shank 59 of a nut and bolt assembly 60. Bore 62 in jaw member 14 which accommodates this shank has a somewhat larger diameter than the shank, to provide a degree of clearance for the shank. A compression spring 64 interposed between the back of jaw member 14 and nut 66 in the nut and bolt assembly constitutes a biasing means functioning to draw shank 60 to the right in FIG. 4, thus to urge the outer jaw member toward the inner one.

The opposed upper margins of the jaw members define between them a course adapted for the lengthwise travel of saw chain with the clamp mechanism released. Thus, and as can be seen in FIG. 4, along the upper margin of member 14 is a shelf region 68, and extending along each of the jaw members are elongate recessed channel regions 70, 72. With the jaw members opened up, the recessed channel regions move away from each other, to permit saw chain, such as that indicated at 74 in FIGS. 6 and 7, to be advanced along the course defined at the top of the jaw members. With release of actuating arm 54 to permit movement of the jaw members toward each other under the urging of spring 64, face portions 76, 78 bounding part of the recessed channel regions move toward each other to clamp saw chain disposed therebetween.

As demonstrated by saw chain 74, the usual chain includes a succession of links held together in the chain by rivets, such as those shown at 80. Two of such rivets hold a cutter link, such as the one shown at 82, one being adjacent each end of the cutter link and each rivet having opposite ends exposed on opposite sides of the saw chain. These opposite ends are rounded, and protrude somewhat from the faces of the links bound by the rivets.

In order precisely to orient a portion of a saw chain (namely, the cutter link) when such is clamped by the clamp mechanism, each face portion 76, 78 is provided with a pair of concave depressions, such as those shown at 84, 86. These depressions complement in shape the rounded ends of the rivets which hold the links in the chain together. Further, they have a spacing from each other which corresponds to the spacing between adjacent rivets used in the fastening of a link in the chain. As a consequence, when the jaw members are brought together, and should a cutter link which is to be sharpened be slightly out of line, there is a tendency for the rivets holding the link to shift the small degree necessary to produce a seating relationship between the concave depressions 84, 86 and the rounded rivet ends of the link.

With reference to FIG. 4, there is indicated a selectively operable means for moving the outer jaw member away from the inner one to release the saw chain after the saw sharpening operation has been performed. Such comprises a cam 88 operated by a selectively operated motor 90 which rotates with operation of the motor to bear down on actuating arm 54 causing the same to rock so as to move jaw member 16 in a counterclockwise direction in FIG. 4.

Ball member 52 provides a mounting for jaw member 16 which accommodates swinging of the jaw member in a swing direction which extends toward jaw member 14. Additionally, the ball member provides for limited pivotal movement of member 16 in a direction extending laterally of this general swing direction. There has been described in connection with bore 62 which receives shank 36 a limited amount of clearance. As a consequence, when jaw member 16 moves toward jaw member 14, on moving up against the rivet ends holding a cutter link in place, and should such rivet ends be slightly out of properly oriented position, jaw member 16 may shift laterally slightly to seek out a properly centered position with the rivet ends, thus to promote a finally seated relationship with the cutter link finally clamped.

Explaining the operation of the structure described above, the clamp mechanism is placed in a release position, to free movement of saw chain along the top of the clamp, by actuating motor 90 to cause the actuating arm 54 to rock in a counterclockwise direction in FIG. 4, thus to swing jaw member 16 in the same direction with compression of spring 64. The saw chain is then advanced along the channel defined at the top of the clamp mechanism, as by pulling on the chain in a region of the chain which is located to one side of the clamp mechanism. Such ordinarily would be done mechanically, with pulling stopped when a cutter link which is to be sharpened is positioned with the rivets at its ends substantially in registry with concave depressions 84, 86 disposed on either side of the cutter link. It should be understood, however, that there is a certain amount of slack in any saw chain by reason of slight clearances provided between the rivets and the links along the length of the chain, and exact positioning of the cutter link in this position cannot be assured through the pulling action described. Thus, the positioning action so far described is an approximate positioning of the cutter link only.

With the cutter link approximately positioned, cam 88 is actuated to permit arm 54 to rock in a clockwise direction in FIG. 4. This permits coiled compression spring 64 to draw jaw member 16 toward member 14 to effect clamping of the chain by the clamp mechanism. As jaw member 16 moves toward jaw member 14, depressions 84, 86 on either side of the chain move against over exposed rivet ends, with the saw chain tending to shift to the degree necessary to produce exact alignment of the rivet ends with the depressions, and alignment of the depressions on opposite sides of the chain with each other. With the chain finally clamped the cutter is held in a position which is precisely oriented with respect to the jaw members and the adjacent work station.

The cutter element is now ready for sharpening. With completion of the sharpening operation, the clamp mechanism is released to permit the positioning of a new cutter element in the manner just described.

Through loosening of inner jaw member 14 with respect to support 10, adjustments in the position of the inner jaw member, and in turn the position of the clamp mechanism as a whole, may be made relative to support 10.

While an embodiment of the invention has been described, it should be obvious that variations and modifications are possible without departing from the invention.

It is claimed and desired to secure by Letters Patent:

1. In a clamp adapted to hold an elongate workpiece with such indexed relative to a work station for the workpiece, said workpiece having an irregular contour in a direction extending along the length thereof with portions recurring along its length having matching contour,
a first jaw member,
releasable means for fixing said first jaw member in different adjusted positions relative to said support,
a second jaw member and means mounting said second jaw member on said first jaw member accommodating movement of the second member toward and away from the first member to effect clamping and release of a workpiece, respectively, said means mounting said second jaw member comprising a ball pivot mounting accommodating swinging of the second jaw member in a swing direction extending toward the first jaw member and limited pivotal movement laterally of said swing direction,
biasing means urging said second jaw member toward the first jaw member,
said first and second jaw members having shaped opposed face portions complementing the contour of said recurring portions of the workpiece and tending to seat over such a portion of the workpiece when clamping onto the workpiece thus to orient the workpiece relative to the jaw members.

2. The clamp of claim 1, which further includes selectively operable means for moving said second jaw member away from said first jaw member against the urging of said biasing means.

3. The combination of a support,
a clamp mounted on said support,
said clamp including first and second jaw members and a ball pivot mounting pivotally mounting said second jaw member whereby the latter is movable toward and away from the first jaw member through swinging movement of said second jaw member in a swing direction which extends toward the first jaw member to effect clamping and release positioning by the clamp in an opposed set of margins of the jaw members, the ball pivot mounting further affording limited pivotal movement of said second jaw member laterally of said swing direction,
said opposed margins defining between them a course adapted for the lengthwise travel of saw chain along the course with the clamp in a release position,
said margins including at a region intermediate the ends of said course opposed face portions each with paired concave depressions complementing the ends of the usual rivet in saw chain which holds links together, and said concave depressions seating over such rivet ends with the clamp in a clamping position thus to orient the chain relative to the jaw members.

4. The combination of claim 3, wherein said clamp is mounted on said support therough means fixing said first jaw member to said support, said ball pivot mounting pivotally mounts the second jaw member on said first jaw member, biasing means is interposed between the first and second jaw member urging the second jaw member into a clamping position, and which further includes selectively operable means for swinging said second jaw member away from said first jaw member against the urging of said biasing means.

5. The combination of claim 3, wherein said clamp is mounted on said support through means fixing said first jaw member to said support, said means being releasable to accommodate adjustable movement of said first jaw member relative to said support, the mounting of said first jaw member on said support further including guide means guiding said adjustable movement along a path, and said ball pivot mounting pivotally mounts said second jaw member on said first jaw member.

6. The combination of claim 3, wherein said clamp is mounted on said support through means fixing said first jaw member to said support, said means being releasable to accommodate adjustable movement of said first jaw member relative to said support, the mounting of said first jaw member on said support further including guide means guiding said adjustable movement along a path, said ball pivot mounting pivotally mounting said second jaw member on said first jaw member, and which further includes biasing means interposed between the first and second jaw members urging the second jaw member into a clamping position, and selectively operable means for moving said second jaw member away from said first jaw member against the urging of said biasing means.

* * * * *